US005211774A

United States Patent [19]

Garde et al.

[11] Patent Number: 5,211,774

[45] Date of Patent: May 18, 1993

[54] ZIRCONIUM ALLOY WITH SUPERIOR DUCTILITY

[75] Inventors: Anand M. Garde, West Simsbury; Satya R. Pati, Simsbury, both of Conn.

[73] Assignee: Combustion Engineering, Inc., Windsor, Conn.

[21] Appl. No.: 761,509

[22] Filed: Sep. 18, 1991

[51] Int. Cl.[5] .......... C22C 16/00

[52] U.S. Cl. .......... 148/421; 148/672; 420/422

[58] Field of Search .......... 148/421, 672; 420/422

[56] References Cited

U.S. PATENT DOCUMENTS

| | | | |
|---|---|---|---|
| 3,261,682 | 7/1966 | Rosler et al. | 75/177 |
| 3,271,205 | 9/1966 | Winton et al. | 148/133 |
| 4,065,328 | 12/1977 | Cheadle | 75/177 |
| 4,212,686 | 7/1980 | Lunde et al. | 75/177 |
| 4,584,030 | 4/1986 | McDonald et al. | 148/421 |
| 4,648,912 | 3/1987 | Sabol et al. | 148/133 |
| 4,649,023 | 3/1987 | Sabol et al. | 420/422 |
| 4,675,153 | 6/1987 | Boyle et al. | 376/416 |
| 4,775,508 | 10/1988 | Sabol et al. | 376/416 |
| 4,810,461 | 3/1989 | Inagaki et al. | 420/422 |
| 4,863,685 | 9/1989 | Taylor | 420/422 |
| 4,879,093 | 11/1989 | Garde | 420/422 |
| 4,938,920 | 7/1990 | Garzarolli et al. | 420/422 |
| 4,963,316 | 10/1990 | Stehle et al. | 420/422 |
| 4,963,323 | 10/1990 | Matsuo et al. | 420/422 |
| 4,992,240 | 2/1991 | Komatsu et al. | 420/422 |
| 5,017,336 | 5/1991 | Matsuo et al. | 420/422 |

OTHER PUBLICATIONS

Eucken, C. M., Fiden, P. T., Trapp-Pritsching, S. and Weidinger, H. G., "Influence of Chemical Composition on Uniform Corrosion of Zirconium-Base Alloys in Autoclave Tests", Zirconium in the Nuclear Industry, 8th Intl. Symposium, ASTM STP 1023, L. F. P. Van Swam and C. M. Eucken, Eds., American Society for Testing and Materials, Philadelphia, Pa, 1989, pp. 113-127.

McInteer, W. A., Baty, D. L. and Stein, K. O., "The Influence of Tin Content on the Thermal Creep of Zircaloy-4", Zirconium in the Nuclear Industry, 8th International Symposium, ASTM STP 1023, L. F. P. Van Swam and C. M. Eucken, Eds., American Society for Testing and Materials, Philadelphia, Pa., 1989, pp. 621-640.

Scott, D. B., "Notes on The Corrosion Behavior of Zircaloy-2 With Various Levels of Iron Content", Zirconium Highlights, WAPD-ZH-17, May 1959, pp. 11-13.

Isobe, T. and Matsuo, Y., "Development of high corrosion resistance zirconium-base alloys", Zirconium in the Nuclear Industry, 9th International Symposium, (Nov. 5-8, 1990), ASTM STP 1132, A. M. Garde and C. M. Eucken, Eds., American Society for Testing and Materials, Philadelphia, Pa., 1991, pp. 1-19.

Welding Handbook, pp. 472-477.

*Primary Examiner*—Upendra Roy
*Attorney, Agent, or Firm*—Ronald P. Kananen

[57] ABSTRACT

A stabilized alpha metal matrix provides an improved ductility, creep strength, and corrosion resistance under neutron irradiation environment in a zirconium alloy containing tin in a range of 0.8 to 1.2 percent; iron in a range of 0.2 to 0.5 percent, and typically 0.35 percent; chromium in a range of 0.1 to 0.4 percent, and typically 0.25 percent; niobium in a range of from a measurable amount up to 0.6 percent, and typically 0.30 percent; silicon in a range of 50 to 200 ppm, and typically 100 ppm; and oxygen in a range 900 to 1800 ppm, typically 1600 ppm. The silicon is added as an alloying element to reduce hydrogen absorption by the alloy and to reduce variations in the corrosion resistance with variations in the processing history of the alloy.

22 Claims, No Drawings

ZIRCONIUM ALLOY WITH SUPERIOR DUCTILITY

BACKGROUND OF THE INVENTION

This invention relates to alloys for use in light water nuclear reactor (LWR) core structural components and fuel cladding. More particularly, this invention relates to a zirconium alloy for such use which exhibits superior ductility, creep strength, and corrosion resistance against irradiation. Still more particularly, this invention relates to a zirconium alloy with silicon, niobium, iron, tin and oxygen in particular ranges.

DESCRIPTION OF THE PRIOR ART

Zirconium alloys are used in the fuel assembly structural components of nuclear reactors, such as in fuel rod cladding, guide or thimble tubes, grid strips, instrument tubes, and so forth because of their low neutron cross section, good corrosion resistance in high pressure/high temperature steam and water environment, good mechanical strength and fabricability. Zirconium alloys, particularly those commonly known as Zircaloy-2 and Zircaloy-4 have been used in light water reactor cores because of their relatively small capture cross section for thermal neutrons. The addition of 0.5 to 2.0 percent by weight niobium and up to 0.25 percent of a third alloying element to these zirconium alloys for purposes of corrosion resistance in the reactor core is suggested in U.S. Pat. No. 4,649,023 as part of a teaching of producing a microstructure of homogeneously disbursed fine precipitates of less than about 800 angstroms. The third alloying element is a constituent such as iron, chromium, molybdenum, vanadium, copper, nickel and tungsten.

Pellet-clad interaction (PCI) resistance is sought in U.S. Pat. Nos. 4,675,153 and 4,664,831 by use of zirconium-based alloys including "zirconium-2.5 w/o niobium". The latter teaching also refers to "Zr-Nb alloys containing about 1.0 to 3.0 w/o Nb". In these patents, oxygen is present "below about 350 ppm of said alloy".

U.S. Pat. No. 4,648,912 teaches improving high temperature corrosion resistance of an alpha zirconium alloy body by rapidly scanning the surface of the body with a laser beam. The alloy treated included zirconium-niobium alloys. Thus, it has been found by various investigators in the prior art literature that the addition of niobium to a zirconium alloy for use in light water reactors will reduce hydrogen uptake from waterside corrosion, stabilize oxygen-irradiation defect complexes, and make the alloy more resistant to annealing of irradiation damage. It is also reported by investigators that niobium will enhance work hardenabiltiy of irradiated Zircaloy but that an addition of niobium above the 1 percent level will not result in further additional benefit in mechanical properties.

An improved ductile irradiated zirconium alloy is described in U.S. Pat. No. 4,879,093 by an inventor in this application. The alloy has a stabilized microstructure which minimizes loss of alloy ductility required to resist the release of fission gases and to handle spent fuel safely. The alloy retains a reasonable corrosion resistance in both pressurized water reactors (PWR) and boiling water reactors (BWR) because of its optimum intermetallic precipitate average particle size. The alloy of the '093 patent is based on an alpha phase zirconium-tin-niobium or alpha phase zirconium-tin-molybdenum alloy having characteristics as shown in Table 1 of that patent with niobium, if present, in a range of from a measurable amount up to 0.6 percent by weight. The molybdenum, if present, is in a range of from a measurable amount up to 0.1 percent by weight. The zirconium-tin system is known as "Zircaloy" and, typically, if Zircaloy-4, for example, would also have 0.18 to 0.24 percent by weight iron, 0.07 to 0.13 percent by weight chromium, oxygen in the range of from 1000 to 1600 ppm, 1.2 to 1.7 percent by weight tin, and the remainder zirconium.

U.S. Pat. No. 4,992,240 discloses another zirconium alloy containing on a weight basis, 0.4 to 1.2% tin, 0.2 to 0.4% iron, 0.1 to 0.6% chromium, not higher than 0.5% of niobium, and balance oxygen and zirconium, wherein the sum of weight proportions of tin, iron and chromium is in the range of 0.9 to 1.5%. Oxygen, according to FIG. 4 of the '240 patent, is about 1770 ppm to 1840 ppm. Niobium is apparently optional, and silicon is not reported.

Recent trends in the nuclear industry include shifts toward higher coolant temperatures to increase the thermal efficiency and toward higher fuel discharge burnups and longer irradiation cycles to increase the fuel utilization. The higher coolant temperatures, longer exposure cycles and discharge burnups tend to increase the in-reactor corrosion and hydrogen uptake of the zirconium alloys. The high levels of neutron fluence and simultaneous hydrogen pickup degrade the ductility of zirconium alloys. For these more demanding service conditions, it is therefore necessary to improve the corrosion resistance in radiated ductility of zirconium alloys.

Accordingly, it is a continuing problem in this art to develop a zirconium alloy having superior ductility after irradiation; good corrosion resistance, especially weakly dependent on the processing history; reduced hydrogen absorption by the alloy; and a significant strength due to solid solution alloying elements.

DESCRIPTION OF THE PREFERRED EMBODIMENTS

It is an object of this invention, therefore, to provide a zirconium alloy with improved corrosion resistance.

It is an additional object of this invention to provide a zirconium alloy with an improved irradiated ductility.

It is still another object of this invention to provide a zirconium alloy with reduced hydrogen absorption.

It is yet another object of this invention to provide a zirconium alloy with a significant solid solution alloy strength and enhanced creep strength.

The invention is based upon the theory that ductility after irradition is improved by selecting the composition of the alloy such that, as far as possible, an addition of the different levels of the alloying element does not result in precipitation of new phases in the microstructure apart from the usual zirconium-iron-chromium precipitates observed in commercial Zircaloy-4. The reasons for selecting specific levels of the different alloying elements are given below, and the composition of the alloy according to the invention is shown in Table 1.

The alloy of the present invention thus includes tin in a range of 0.8 to 1.2 percent wherein either limit is typical. The alloy also has iron in a range of 0.2 to 0.5 percent, and typically 0.35 percent; chromium in a range of 0.1 to 0.4 percent and typically 0.25 percent; niobium is in a range of from a measurable amount up to 0.6 percent, and typically 0.30 percent; silicon is in the range of 50 to 200 parts per million (ppm) and typically 100 ppm, and oxygen is in the range of from 900 to 1800 ppm and typically 1600 ppm.

A decrease in the tin level below the 1.2 percent lower limit in Zircaloy-4 improves its corrosion resistance. [1] However, the trend of the mechanical property data regarding the influence of tin content on the thermal creep of zirconium alloys at 400° C. indicates that a decrease in tin level will degrade the creep resistance of zirconium alloys. [2] The selected range of tin level of 0.8 to 1.2 percent tin is expected to provide a combination of good corrosion resistance and good creep resistance for the alloy of the invention.

The corrosion resistance of Zircaloy-2 and iron alloys in both 360° C. water and 400° C. steam depends on the iron level. [3]. While best corrosion resistance in 360° C. water was observed with 0.45 percent iron, the best corrosion resistance in 400° C. steam was observed at 0.25 percent iron. In order to achieve good corrosion resistance in both steam and water environments, an intermediate value of 0.35 percent Fe was selected for the new alloy of the invention.

Chromium is mainly added to improve the strength and creep resistance of the new alloy. The range of 0.3 to 0.7 for (Fe+Cr) is useful in improving mechanical properties of the alloy without degradation of the corrosion resistance. [4] Thus, the chromium range of 0.1 to 0.4 percent, and typically 0.25 percent was selected for the new alloy.

The addition of niobium in an amount in the range of from a measurable amount to 0.6 percent and typically an amount of 0.3 percent is done to improve the irradiated ductility of the new alloy, [5] to improve the corrosion resistance, [4] and to reduce the hydrogen absorption. [5] The amount of niobium is limited to retain a predominantly single phase alpha structure of the alloy for superior corrosion resistance, mechanical properties, and good fabricability.

The silicon, in a range of 50 to 200 ppm, and typically at 100 ppm, is added as an alloying element to reduce the hydrogen absorption by the alloy and also to reduce the variation of the corrosion resistance with variations in the processing history of the alloy. [1]

Oxygen, in a range of 900 to 1800 ppm, and typically at 1600 ppm, is added as a solid solution strengthening alloying element while retaining good fabricability.

Thus, the invention of the new alloy described in this disclosure achieves good corrosion resistance, irradiated ductility, and reduced hydrogen absorption by its selected composition. The exposure of zirconium alloys to a water reactor environment results in irradition damage to the microstructure and hydride precipitation. Both of these factors reduce the ductility and corrosion resistance of the irradiated alloys. The higher levels of alloying elements generally improve the strength and creep resistance of zirconium alloys with a concurrent degradation of the corrosion resistance. A new zirconium alloy, according to this invention, with optimum levels of tin, niobium, iron, chromium, silicon and oxygen is proposed that provides a good combination of mechanical properties and corrosion resistance as a result of a predominantly single phase microstructure.

BIBLIOGRAPHY (1) Eucken C. M., Finden, P. T. Trapp Pritsching and Weidinger, H. G., "Influence of Chemical Composition on Uniform Corrosion of Zirconium Base Alloys in Autoclave Tests", *Zirconium in the Nuclear Industry Eighth International Symposium*, ASTM STP 102, L. F. P, Van Swam and C. M. Eucken, Eds; American Society for Testing and Materials, Philadelphia, 1989, pp 113–127.

(2) McInteer, W. A., Baty, D. L. and Stein, K. O., "The Influence of tin content on the Thermal creep of Zircaloy-4", *Zirconium in the Nuclear Industry, Eighth International Symposium*, ASTM STP 1023, L. F. P. Van Swam and C. M. Eucken, Eds; American Society for Testing and Materials, Philadelphia, 1989 pp 621–640.

(3) Scott, D. B., "Notes on the Corrosion Behavior of Zircaloy-2 with various levels of iron content," *Zirconium Highlights*, WAPD-ZH-24, p 11, (1960).

(4) Isobe, T. and Matsuo, Y., "Development of High Corrosion Resistance Zirconium-base Alloyos", Paper presented at the 9th International Symposium on Zirconium in the Nuclear Industry, Kobe, Japan, November 1990.

(5) Garde, A. M., U.S. Pat. No. 4,879,093, "Ductile Irradiated Zirconium Alloy", issue date Nov. 7, 1989.

TABLE 1

| | Preferred Embodiment Modified Zirconium Alloy Range | Typical |
|---|---|---|
| Tin, Wt. % | 0.8 to 1.2% | Same |
| Iron, Wt. % | 0.2 to 0.5% | 0.35% |
| Chromium, Wt. % | 0.1 to 0.4% | 0.25% |
| Niobium, Wt. % | Measurable amount up to 0.6% | 0.30% |
| (or Molybdenum) | Measurable amount up to 0.1% | |
| Silicon, ppm | 50 to 200 ppm | 100 ppm |
| Oxygen, ppm | 900 to 1800 ppm | 1600 ppm |
| Zirconium | Balance | Balance |

We claim:

1. An improved ductile modified zirconium alloy for use in light water nuclear core structural elements in fuel cladding, which comprises:

measurable amounts of alloying material from the group including niobium or molybdenum, or combinations thereof, niobium being present in a range of from a measurable amount up to 0.6 percent by weight, said alloying material homogeneously dissolved in alpha Zircaloy with 0.8 to 1.2 percent by weight tin, 0.2 to 0.5 percent by weight iron, 0.1 to 0.4 percent by weight chromium, silicon in the range of 50 to 200 ppm, and oxygen in the range of 900 to 1800 ppm.

2. The improved ductile modified zirconium alloy of claim 1 wherein the iron concentration is about 0.35 percent.

3. The improved ductile modified zirconium alloy of claim 1, wherein the silicon is present in a range of 80 to 200 ppm.

4. The improved ductile modified zirconium alloy of claim 1, wherein the iron is present in a range of 0.4 to 0.5 percent.

5. The improved ductile modified zirconium alloy of claim 1, wherein the niobium is present in a range of 0.5 to 0.6 percent.

6. The improved ductile modified zirconium alloy of claim 2, wherein the chromium concentration is 0.25 percent.

7. The improved ductile modified zirconium alloy of claim 6 wherein the preferred niobium composition is about 0.30 percent.

8. The improved ductile modified zirconium alloy of claim 7 wherein the silicon content is about 100 ppm.

9. The improved ductile modified zirconium alloy of claim 8 wherein the oxygen content is about 1600 ppm.

10. A zirconium alloy for use in light water nuclear core structure elements in fuel cladding, which comprises a composition as follows:

tin, in a range of 0.8 to 1.2 percent;
iron, in a range of 0.2 to 0.5 percent;
chromium, in a range of 0.1 to 0.4 percent;
niobium, in a range of from a measurable amount up to 0.6 percent;
silicon, in a range of 50 to 200 ppm; and
oxygen, in a range of 900 to 1800 ppm.

11. The alloy as set forth in claim 10 wherein said chromium is about 0.25 percent.

12. The alloy as set forth in claim 10 wherein said niobium is about 0.30 percent.

13. The alloy as set forth in claim 10 wherein said silicon is about 100 ppm.

14. The alloy as set forth in claim 10 wherein said oxygen is about 1600 ppm.

15. The zirconium alloy of claim 10, wherein the silicon is present in a range of 80 to 200 ppm.

16. The zirconium alloy of claim 10, wherein the iron is present in a range of 0.4 to 0.5 percent by weight.

17. The zirconium alloy of claim 10, wherein the niobium is present in a range 0.5 to 0.6 percent.

18. A method of making a zirconium alloy, comprising the steps of:

providing a zirconium-alloy having tin in a range of about 0.8 to 1.2 percent; iron in a range of 0.2 to 0.5 percent; chromium in a range of 0.1 to 0.4 percent; niobium in a range of from a measurable amount to 0.6 percent; and an oxygen in a range of 900 to 1800 ppm; and adding silicon in a range of 50 to 200 ppm as an alloying element to reduce the hydrogen absorption by the alloy and to reduce the variation of the corrosion resistance with variations in the processing history of the alloy.

19. The method as set forth in claim 18 wherein said silicon concentration is about 100 ppm.

20. The method as set forth in claim 18 wherein said iron concentration is about 0.35 percent.

21. The method as set forth in claim 18 wherein said chromium concentration is about 0.25 percent.

22. The method as set forth in claim 18 wherein said niobium concentration is about 0.30 percent.

* * * * *